Feb. 8, 1938.  R. D. GARDNER  2,107,566
CUT-OFF MACHINE
Filed March 9, 1936  2 Sheets—Sheet 1

INVENTOR
Ralph D. Gardner
By Parker, Carlson, Pitzner & Hubbard
ATTORNEYS

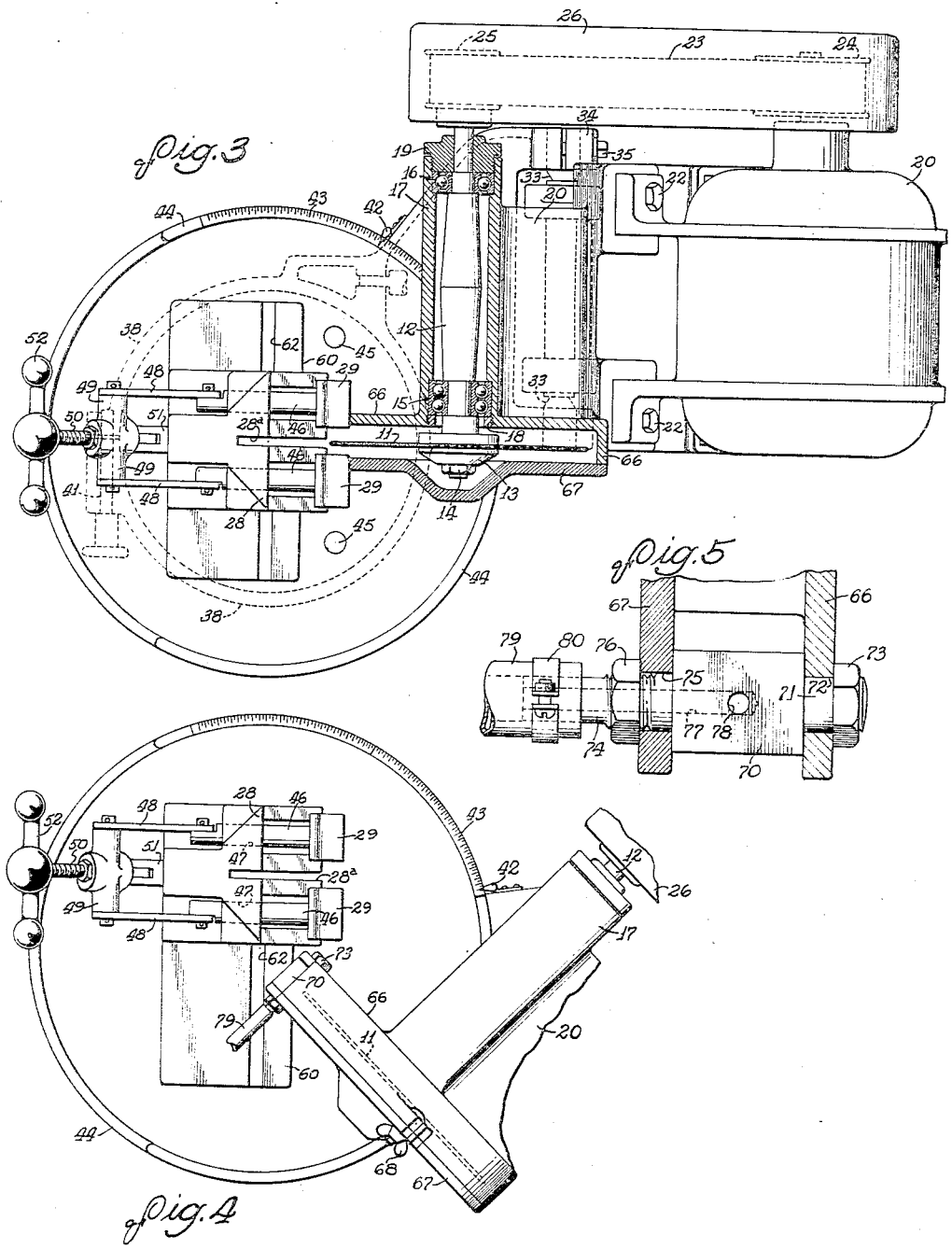

Patented Feb. 8, 1938

2,107,566

UNITED STATES PATENT OFFICE 2,107,566

CUT-OFF MACHINE

Ralph D. Gardner, Rockford, Ill., assignor to Whitney Metal Tool Company, Rockford, Ill., a corporation of Illinois Application March 9, 1936, Serial No. 67,762

13 Claims. (Cl. 51—98)

My invention relates to cut-off machines, and more particularly to an improved arrangement of the parts thereof which is especially adapted for use in cut-off machines of the abrasive type; that is, those utilizing abrasive disks as the cutter or cutting tool, although certain aspects of my invention are applicable to other types of cut-off machines.

It is an object of my invention to provide a cut-off machine having a work support including a fixed jaw and a movable jaw, and an arrangement for adjusting the relative positions of the work support and the cutter of the machine in such manner that the line of action of the pressure applied to the work piece by the cutter will pass through the fixed jaw rather than the movable jaw, thus providing a rigid support for the work piece without applying excessive clamping pressure thereto which might otherwise distort the work piece.

Another object of my invention is to provide a cut-off machine including a power driven rotary cutter and an improved arrangement for swiveling the cutter about a vertical axis as well as for swinging the same about a horizontal pivotal axis so that a fixed work piece may be cut at any angle desired.

Another object of my invention is to provide a cut-off machine of the abrasive type including an improved arrangement for mounting the cutter and the work piece with respect to each other so that a portion of the work piece of minimum area may be readily presented to the cutter, thus minimizing the heating of the cutter and insuring a clean, sharp cut in the work piece.

A further object of my invention is to provide an improved cut-off machine of the abrasive type which requires a minimum number of parts, is economical to manufacture and which is effective and efficient in operation.

Further objects and advantages of my invention will become apparent as the following description proceeds, and the features of novelty which characterize my invention are pointed out with particularity in the claims annexed to and forming a part of this specification.

For a better understanding of my invention, reference may be had to the accompanying drawings, in which, Figure 1 is a side elevation partly in section of a cut-off machine embodying my invention.

Fig. 3 is a plan view partly in section of the cut-off machine shown in Fig. 1.

Fig. 4 is a partial plan view of the cut-off machine shown in Fig. 1, and illustrates the swiveling adjustment of the cutter disk with respect to the work support.

Fig. 5 is an enlarged detail view partly in section of a portion of the cutter disk guard and of the water connection for supplying cooling water to the cutter disk.

Figure 1:
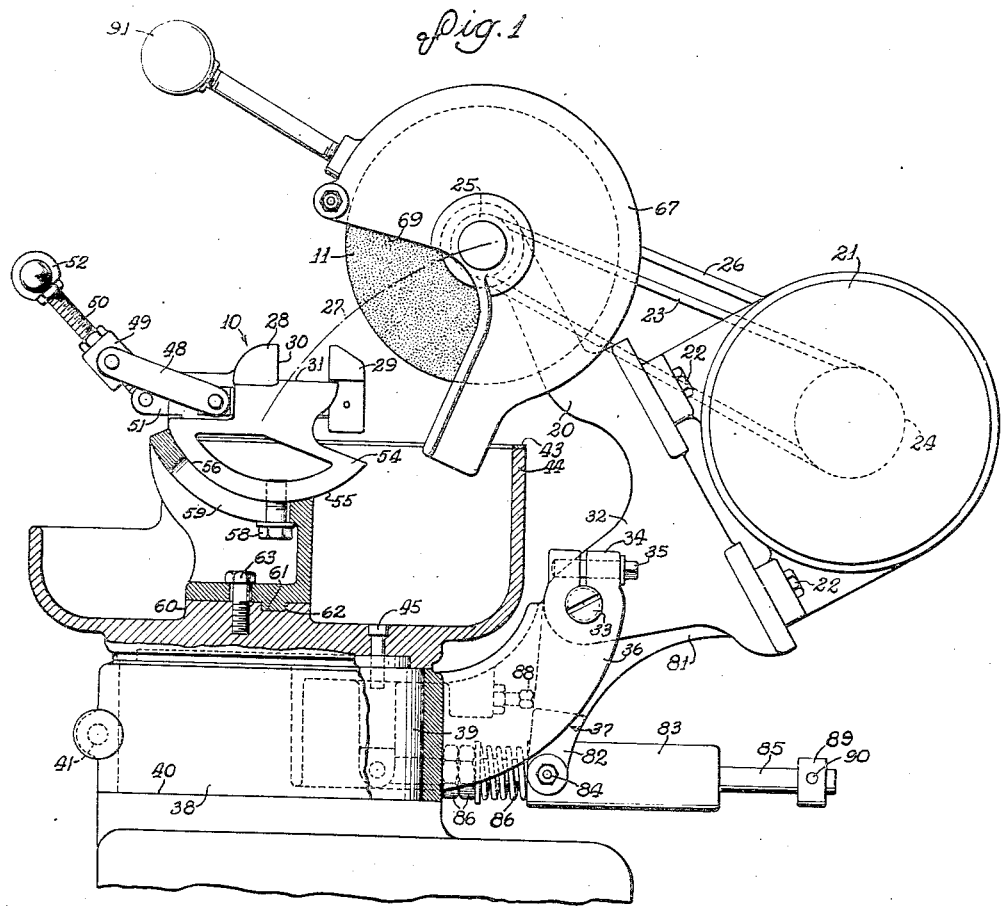

Referring to the drawings, I have shown in Fig. 1 a cut-off machine of the abrasive type embodying my invention and including as its principal elements a work support 10 and a rotary cutting disk or cutter 11 which are relatively movable with respect to each other. This machine is particularly useful for cutting off portions of strips of light metal molding or the like having an irregular cross-section, although it may be effectively used to cut off many other types of material. In cutting any type of material with an abrasive type cutter, it is very desirable that the work piece be arranged with respect to the cutter in such manner that a portion of minimum area is presented thereto since the heating of the abrasive cutter increases rapidly as the area of the material being cut is increased. Such a heating of the abrasive cutter disk is undesirable since the work piece is also heated and a sharp burr is formed at the edge of the cut which must be subsequently removed by hand, and the surface of the cut is in general rough and somewhat irregular. In my improved cut-off machine I have provided an arrangement which obviates this difficulty in that the work support may be adjusted with respect to the line of movement of the cutter disk in such manner that a portion of the work piece of minimum area is presented to the cutter disk.

Difficulty may also be encountered in cutting light metal moldings or similar materials with any type of cutter disk and particularly with abrasive type cutter disks, because the work piece is likely to be distorted upon the application of a strong clamping pressure thereto. In general, I have obviated this difficulty by providing a work supporting arrangement including a fixed jaw and a movable jaw and an adjustable mounting therefor of such character that the line of action of the pressure applied to the work piece passes through the fixed jaw rather than the movable jaw. As a consequence, the clamping pressure required is minimized and work pieces of light metal may be readily cut without distortion due to excessive clamping pressure.

In the particular machine illustrated in the drawings the cutter 11 is a relatively thin disk made of particles of abrasive such as aluminum oxide, silicon carbide, or diamond dust bonded together by rubber, a resinous compound, or some similar material. I prefer to use an abrasive cutter disk made of aluminum oxide bonded together with rubber for cutting steel or nonferrous metals. The cutter disk 11 is provided with a hub 13 which is rigidly clamped to the end of a rotatable shaft 12 by lock nut 14. The shaft 12 is journaled in ball bearings 15 and 16 arranged adjacent the opposite ends thereof. The outer races of the ball bearings 15 and 16 are fitted in counter bores formed in opposite ends of a sleeve 17 and are held in position therein by locking collars 18 and 19, respectively, which are threaded in the outer ends of the sleeve 17. The sleeve 17 is an integral part of the upper end of an inclined bracket 20, which forms a swinging support for the cutter disk. A suitable electric driving motor 21 is also mounted on the bracket 20 adjacent the opposite end thereof, being secured thereto by mounting bolts 22. The cutter disk 11 is driven by the electric driving motor 21 through a flexible belt 23 which passes over a driving pulley 24 secured to the motor shaft and a driven pulley 25 secured to one end of the shaft 12. A sheet metal guard 26 is preferably positioned over the belt 23.

The bracket 20 is pivotally supported in such manner that the cutter disk 11 may be swung into and out of engagement with a work piece held in the work support 10. This pivotal movement of the cutter disk 11 is preferably about a horizontal axis located below the work support 10 in order that the path of movement of the center of the cutter disk 11, indicated by the dot-dash line 27 in Figs. 1 and 2, and which also represents the line of action of the pressure applied to the work piece, will pass through a fixed jaw 28 of the work support 10 rather than the movable jaw 29 thereof. It is also preferable that the path of movement 27 lie adjacent the line of intersection of the planes of the vertical and horizontal supporting surfaces 30 and 31, respectively, of the fixed jaw 28 since the cutter disk 11 thus presses the work piece firmly against the two intersecting faces of the fixed jaw of the work support so that the work piece is rigidly supported thereon without the necessity of applying excessive clamping pressure thereto. In the particular construction illustrated, the bracket 20 is provided with depending projections 32 which are pivotally supported on trunnion pins 33. The trunnion pins 33 are releasably clamped in jaws 34 by locking screws 35. The jaws 34 are formed on the upper ends of arms 36 of a supporting frame designated generally by the numeral 37.

The supporting frame 37 is arranged to be releasably clamped in various positions about the work support 10 in order that the cutter disk 11 may be swiveled about the work piece so as to make angular cuts therein. Thus, the supporting frame 10 is provided with curved arms 38 which embrace the vertical cylindrical machine base 39 and rest on a shoulder 40 formed thereon. The ends of the curved arms 38 are releasably secured together by a clamping screw 41 so that they may be clamped tightly about the base 39 in order to hold the cutter disk 11 in any desired angular position upon tightening the clamping screw 41. The angular adjustment of the cutter disk 11 with respect to the work piece is indicated by an index pointer 42 secured to the supporting frame 37 and cooperating with an index scale 43 secured to the upper edge of a bowl 44 held in position on the top of the base 39 by a series of screws 45. The bowl 44 is adapted to contain a quantity of water for quenching any sparks thrown off by the cutter disk 11 on its engagement with a metal work piece and also collects cooling water supplied to the cutter disk 11 and thrown off the periphery thereof.

The construction of the particular clamping device illustrated as a part of the work support 10 forms no part of my present invention but is described and claimed in my copending application Serial No. 67,761, filed March 9, 1936. As was noted above, this clamping device includes a fixed jaw 28 and a pair of movable jaws 29 which are secured to pins 46 slidably mounted in holes 47 formed in the fixed jaw 28. The fixed jaw 28 is provided with a centrally located slot 28a therein which permits the cutter disk 11 to pass through a work piece without cutting the clamping device. The movable jaws 29 are moved into and out of clamping engagement with the work piece by a toggle mechanism which includes a pair of links 48 pivotally connected at their inner ends to the pins 46 and pivotally connected at their outer ends to a cross member 49. A threaded rod 50 passes through a tapped hole extending through the member 49 and is pivotally connected at its lower end to a plug 51 which is slidably mounted in a recess formed in the rear side of the fixed jaw 28. Thus, when the rod 50 is moved downwardly by the operating handle 52, the links 48 pulls the supporting pins 46 through the apertures 47 and slide the movable jaws 29 into firm clamping engagement with the work piece. The clamping device is shown in its clamping position in Fig. 2, a work piece 53 consisting of a rectangular strip of metal being illustrated as held in the clamping device.

The fixed jaw 28 of the clamping device described above is provided with an integral supporting member 54 having an arcuate lower surface 55 which rests on a complementary arcuate surface 56 of a supporting bracket 57. The clamping device may be tilted about a horizontal axis into any desired angular relation with respect to the cutter disk 11 by relative movement between the supporting member 54 and bracket 57. When the particular angular adjustment desired has been attained, the supporting member 54 may then be securely clamped to the bracket 57 by a clamping bolt 58 which extends through a slot 59 formed in the upper surface 56 of the supporting bracket 57.

I have also provided an arrangement for moving the clamping device 10 transversely with respect to the cutter disk 11 in order to facilitate making angular cuts in the work piece. The supporting bracket 57 is slidably mounted on a guideway 60 formed in the bottom of the bowl 44. A tongue or key 61 formed on the bottom of the bracket 57 registers with a groove or keyway 62 formed in the upper surface of the guideway 60. The bracket 57 may be releasably clamped in any desired position on the guideway 60 by a clamping screw 63 which passes through a transverse slot 64 formed in the bottom wall of the bracket 57 and is threaded in a tapped hole 65 formed in the bottom of the bowl 44.

In order to avoid excess heating of the abrasive cutter disk 11, it is desirable to supply a cooling liquid thereto such as water or a mixture of water and soluble oil or soda. I have provided an arrangement for supplying a liquid coolant to the cutter disk and also forming a guard therefor which not only prevents the coolant being thrown off from the wheel but also protects the operator against injury due to breakage of the wheel. It is particularly necessary to provide a strong rugged guard construction for abrasive disk cutters of the type described since they rotate at comparatively high speeds. In the particular construction illustrated, an integral cup shaped guard member 66 is formed on the end of the sleeve 17 and surrounds the inner side and edges of the cutter disk 11. A segmental opening is formed in this guard member adjacent the work support 10. A removable cover plate 67 is secured to the guard member 66 by wing nuts and bolts 68. The plate 67 is also provided with a segmental aperture 69 therein adjacent the work support 10.

As best shown in Fig. 5, an arrangement is provided for securing the plate 67 to the guard member 66 and for supplying liquid coolant to the cutter disk 11. This arrangement includes a spacer 70 interposed between the cover plate 67 and guard member 66 adjacent the segmental openings therein. The spacer 70 is provided with a threaded extension or boss 71 which passes through a registering hole 72 formed in the guard member 66 and a nut 73 holds the same in position. The spacer 70 is also provided with a second extension or boss 74 on the opposite end thereof which extends through a hole 75 formed in the cover plate 67 and a nut 76 is threaded on the boss 74 to hold the same firmly in position. A bore 77 extends through the boss 74 and into the interior of the spacer 70 where it communicates with a lateral bore 78 opening into the interior of the guard structure adjacent the cutter disk 11. Water or other coolant may thus be supplied to the cutter disk 11 from a flexible hose 79 through the bores 77 and 78, the hose 79 being secured to the boss 74 by a clamp 80.

I have also provided an arrangement for counter balancing the weight of the motor 21 which otherwise tends to swing the bracket 20 in a clockwise direction about the trunnion pins 33, as viewed in Fig. 1. This arrangement includes a depending member 81 formed on the lower side of the bracket 20 and having a yoke 82 formed on the lower end thereof. The yoke 82 extends about the sides of a cylindrical metal cup 83 and is pivotally secured thereto by bolts 84. The cup 83 is slidably mounted on a rod 85, the inner end of which is secured to the supporting frame 37. A pair of lock nuts 86 are threaded on the rod 85 and a helical compression spring 86 surrounding the rod 85 is interposed between the lock nuts 86 and the inner end of the cup 83. It will thus be seen that the compression of the spring 86 limits the clockwise movement of the bracket 20 and counter balances the otherwise unbalanced weight of the electric motor 21 thereon. In addition, a stop 88 is secured to the supporting frame 37 to positively limit the extent of clockwise pivotal movement of the bracket 20. Also, a collar 89 is secured to the outer portion of the rod 85 by a set screw 90 in order to form a stop engaged by the end of the cup 83 and limiting the counter clockwise movement of the bracket 20. The position of the collar 89 on the rod 85 may be adjusted in order to prevent the cutter disk 11 from entering the slot 28a in the fixed jaw 28 of the clamping device a sufficient distance to cut the same. The adjustable stop collar 89 may also be used to limit to a predetermined amount the depth of the cut to be made in a work piece, if so desired.

Figure 2:
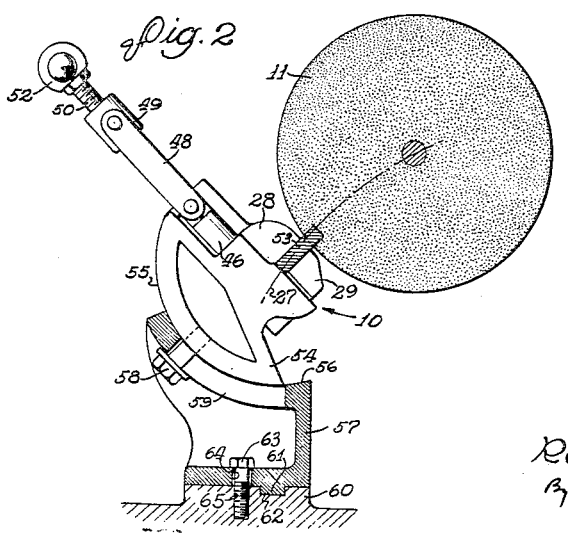
Fig. 2 is a fragmentary side elevation partly in section of a portion of the cut-off machine shown in Fig. 1, and illustrates the movement of the cutter disk with relation to the work piece.

In the operation of the machine described above, a work piece such as the strip of metal 53 indicated in Fig. 2 is placed in the work support 10 between the fixed jaw 28 and movable jaws 29. The handle 52 of the clamping device is then moved downwardly, thus straightening out the toggle links 48 and 50 so that the work piece 53 is firmly clamped between the cooperating jaws 28 and 29. The clamping bolt 58 is then loosened and the supporting member 54 is tilted with respect to the supporting bracket 57 until a portion of the work piece 53 having a minimum area is presented to the cutter disk 11. In the case of the work piece illustrated, the edge thereof has a smaller area than the sides and consequently, it is mounted edgewise in the clamping device. Then when this portion of the work piece has been arranged substantially in alignment with the center of the path of movement of the cutter disk 11, as indicated by the dot-dash line 27 in Figs. 1 and 2, the clamping bolt 58 is tightened, thus holding the supporting member 54 rigidly in its adjusted position. The electric driving motor is then started and cutter disk 11 is swung downwardly about its pivotal axis into engagement with the work piece. A handle 91 is secured to the guard member 66 to facilitate movement of the cutter disk into and out of engagement with the work piece.

If it is desired to make an angular cut in the work piece, the work support bracket 57 is slid along the guideway 60 and then clamped in its extreme position of movement by the screw 63, this being the position illustrated in Fig. 4. The supporting member 54 is tilted with respect to the bracket 57 as described above in order that a portion of the work piece of minimum area will be presented to the cutter disk 11. The clamping bolt 41 is then loosened and the supporting frame 37 is swiveled about the base 39 until the cutter disk 11 is brought into a desired angular relation with respect to the work piece. The angular position may be accurately determined by the pointer 42 and index scale 43. The cutter disk 11 is shown in Fig. 4 as being arranged at substantially 45 degrees with respect to the work support. After having clamped the work piece in the clamping device, the motor 21 is then started and the cutter disk is moved into engagement with the work as described above.

It will thus be seen that the improved cut-off machine which I have provided has a work supporting arrangement of great flexibility by means of which cuts may be made in a work piece at a great variety of angles while, at the same time, the cutter disk is used in its most effective manner. Also, since the cutter disk may be swiveled about the work piece, the area of floor space required for the machine is minimized. That is, if long strips of material are being cut, room need not be provided for maneuvering them as would be the case if the work support 10 were swiveled rather than the cutter disk. This is of particular importance in factory installations of various sorts. The work supporting arrangement which I have provided is not only extremely flexible but it cooperates with the cutter disk support in such manner that the line of action of the pressure applied to the work piece by the cutter disk always passes through the fixed jaw of the clamping mechanism, thus providing a firm support for the work piece.

Although I have illustrated and described a particular embodiment of my invention, I do not desire my invention to be limited to the particular construction shown and described and I intend in the appended claims to cover all modifications within the spirit and scope of my invention.

I claim as my invention:

1. A cut-off machine comprising, in combination, work supporting means including a fixed jaw and a movable jaw for holding a work piece, adjustable means for tilting said work supporting means about a horizontal axis, a rotatably mounted cutter disk, means for pivotally supporting said cutter disk to swing about a horizontal axis located below said work supporting means into and out of engagement with the work piece, the center of said cutter disk having a path of movement about said last named axis passing through said fixed jaw.

2. A cut-off machine comprising, in combination, work supporting means including a fixed jaw and a movable jaw for holding a work piece, said fixed jaw being provided with flat work supporting surfaces arranged substantially at a right angle with respect to each other, adjustable means for tilting said work supporting means about a horizontal axis, means for clamping said work supporting means in its adjusted position, a rotatably mounted cutter disk, means for pivotally supporting said cutter disk to swing about a horizontal axis located below said work supporting means into and out of engagement with the work piece, the center of said cutter disk having a path of movement about said axis passing through said fixed jaw and lying adjacent the line of intersection of the planes of said work supporting surfaces of said fixed jaw.

3. A cut-off machine comprising, in combination, work supporting means for holding a work piece, a rotatably mounted cutter disk, cutter supporting means for pivotally supporting said cutter disk to swing about a horizontal axis into and out of engagement with the work piece, and means for swiveling said cutter disk and cutter supporting means in a horizontal plane about said work supporting means.

4. A cut-off machine comprising, in combination, work supporting means for holding a work piece, a rotatably mounted cutter disk, cutter supporting means for pivotally supporting said cutter disk to swing about a horizontal axis into and out of engagement with the work piece, and adjusting means for swiveling said cutter disk and cutter supporting means in a horizontal plane about said work supporting means, and means for clamping said cutter supporting means in its adjusted position.

5. A cut-off machine comprising, in combination, a vertical cylindrical base, work supporting means mounted on said base for holding a work piece, a cutter disk positioned in a substantially vertical plane, means including a bracket for rotatably supporting said cutter disk about said work supporting means, an electric driving motor operatively connected to said cutter disk and mounted on said bracket, a supporting frame provided with curved arms embracing said cylindrical base, means for adjustably clamping said arms about said base for swiveling said supporting frame about said base, and pivotal means for pivotally connecting said bracket and said supporting frame, said bracket being movable about said pivotal means to swing said cutter disk about a horizontal axis into and out of engagement with the work piece.

6. A cut-off machine comprising, in combination, a vertical cylindrical base, work supporting means mounted on said base for holding a work piece, a supporting frame provided with curved arms embracing said cylindrical base, means for adjustably clamping said arms about said base for swiveling of said supporting frame about said base, an inclined bracket, means for pivotally connecting said supporting frame and said bracket, a cutter disk, means for rotatably supporting said cutter disk on said bracket adjacent the upper end thereof, an electric driving motor operatively connected to said cutter disk, means for mounting said motor on said bracket adjacent the lower end thereof, the weight of said motor tending to swing said pivotal supporting bracket outwardly away from said base, and counterbalancing means for resisting such outward movement of said bracket.

7. A cut-off machine of the abrasive type comprising, in combination, cooperating jaws for holding a work piece, a rotatably mounted abrasive cutter disk, means for pivotally supporting said cutter disk to swing about a horizontal axis into and out of engagement with the work piece, adjustable means for tilting said cooperating jaws about a horizontal axis to present a portion of the work piece of minimum area to said abrasive cutter disk, and means for clamping said cooperating jaws in their adjusted position, thereby minimizing the heating of the abrasive cutter disk and insuring a clean sharp cut in the work piece.

8. A cut-off machine of the abrasive type comprising, in combination, cooperating jaws for holding a work piece, a supporting bracket having an arcuate upper surface, a mounting member for said cooperating jaws having a complementary arcuate lower surface resting on said arcuate surface of said mounting bracket, said mounting member being tiltable on said bracket about a horizontal axis, means for releasably clamping said mounting member on said bracket, a rotatably mounted abrasive cutter disk, and means for pivotally supporting said cutter disk to swing about a horizontal axis into and out of engagement with the work piece, whereby said jaws may be shifted to present a portion of minimum area of a work piece held thereby to said cutter disk.

9. A cut-off machine of the abrasive type comprising, in combination, cooperating jaws for holding a work piece, a rotatably mounted abrasive cutter disk, means for pivotally supporting said cutter disk to swing about a horizontal axis into and out of engagement with the work piece, adjustable means for tilting said cooperating jaws about a horizontal axis to present a portion of the work piece of minimum area to said abrasive cutter disk, and means for swiveling said abrasive cutter disk and said cutter supporting means in a horizontal plane about said work supporting means.

10. A cut-off machine of the abrasive type comprising, in combination, cooperating jaws for holding a work piece, a rotatably mounted abrasive cutter disk, means for pivotally supporting said cutter disk to swing about a horizontal axis into and out of engagement with the work piece, means for swiveling said abrasive cutter disk and said cutter supporting means in a horizontal plane about said work supporting means, adjustable means for tilting said cooperating jaws about a horizontal axis to present a portion of the work piece of minimum area to said abrasive cutter disk, and means for slidably supporting said cooperating jaws for horizontal movement with respect to said abrasive cutter disk.

11. A cut-off machine of the abrasive type comprising, in combination, cooperating jaws for holding a work piece, a supporting bracket having an arcuate upper surface, a mounting member for said cooperating jaws having a complementary arcuate lower surface resting on said arcuate surface of said mounting bracket, said mounting member being tiltable on said bracket about a horizontal axis, means for releasably clamping said mounting member on said bracket, means including a horizontal guideway for slidably supporting said supporting bracket, means for releasably clamping said supporting bracket on said guideway, a rotatably mounted abrasive cutter disk, means for pivotally supporting said cutter disk to swing about a horizontal axis into and out of engagement with the work piece, and means for swiveling said abrasive cutter disk and said cutter supporting means in a horizontal plane about said work supporting means.

12. A cut-off machine of the abrasive type comprising, in combination, a vertical cylindrical base, cooperating jaws for holding a work piece, a supporting bracket mounted on said base and having an arcuate upper surface, a mounting member for said cooperating jaws having a complementary arcuate lower surface resting on said arcuate surface of said mounting bracket, said mounting member being tiltable on said bracket about a horizontal axis, means for releasably clamping said mounting member on said bracket, a supporting frame provided with curved arms embracing said cylindrical base, means for adjustably clamping said arms about said base for swiveling said supporting frame about said base, an inclined bracket, means pivotally connecting said supporting frame and said bracket, an abrasive cutter disk, means for rotatably supporting said cutter disk on said bracket adjacent the upper end thereof, an electric driving motor operatively connected to said cutter disk, means for mounting said motor on said bracket adjacent the lower end thereof, the weight of said motor tending to swing said pivotally supported bracket outwardly away from said base, and counterbalancing means for resisting such outward movement of said bracket.

13. A cut-off machine of the abrasive type comprising, in combination, a vertical cylindrical base, cooperating jaws for holding a work piece, a supporting bracket having an arcuate upper surface, a mounting member for said cooperating jaws having a complementary arcuate lower surface resting on said arcuate surface of said mounting bracket, said mounting member being tiltable on said bracket about a horizontal axis, means for releasably clamping said mounting member on said bracket, means including a horizontal guideway for slidably supporting said supporting bracket on said base, means for releasably clamping said supporting bracket on said guideway, a supporting frame provided with curved arms embracing said cylindrical base, means for adjustably clamping said arms about said base for swiveling said supporting frame about said base, an inclined bracket, means for pivotally connecting said supporting frame and said bracket, an abrasive cutter disk, means for rotatably supporting said cutter disk in said bracket adjacent the upper end thereof, an electric driving motor operatively connected to said cutter disk, means for mounting said motor on said bracket adjacent the lower end thereof, the weight of said motor tending to swing said pivotally supported bracket outwardly away from said base, and counterbalancing means for resisting such outward movement of said bracket.

RALPH D. GARDNER.